No. 895,165. PATENTED AUG. 4, 1908.
W. M. & R. M. COX.
POULTRY FEEDING DEVICE.
APPLICATION FILED FEB. 15, 1907.
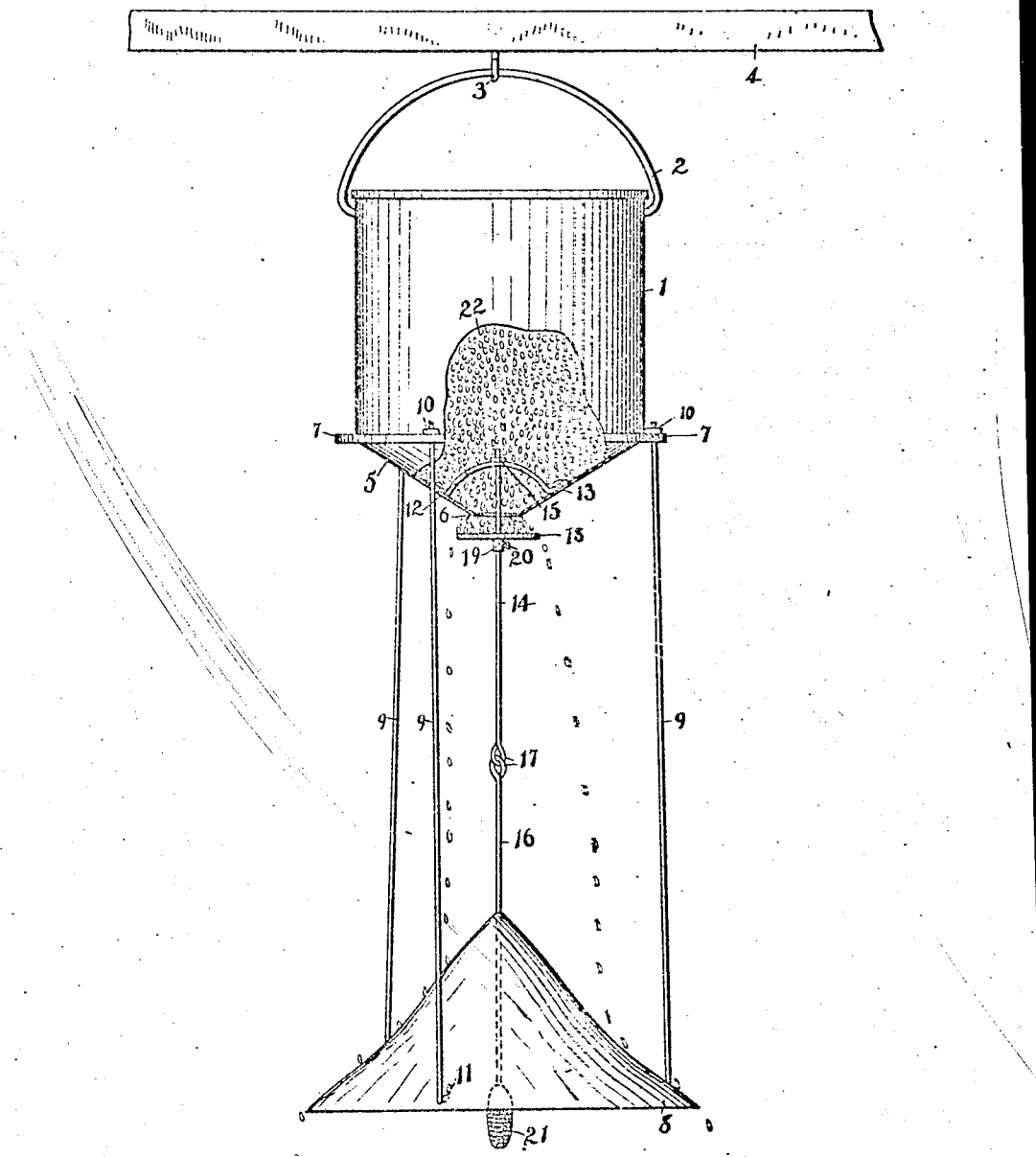

UNITED STATES PATENT OFFICE.

WILLIAM M. COX, OF AVON, AND ROBERT M. COX, OF PRAIRIE CITY, ILLINOIS.

POULTRY-FEEDING DEVICE.

No. 895,165.     Specification of Letters Patent.     Patented Aug. 4, 1908.

Application filed February 15, 1907. Serial No. 357,486.

*To all whom it may concern:*

Be it known that we, WILLIAM M. Cox and ROBERT M. Cox, citizens of the United States, residing at Avon and Prairie City, in the counties of Fulton and McDonough and State of Illinois, have invented certain new and useful Improvements in Poultry-Feeding Devices, of which the following is a specification.

This invention relates to improvements in devices for automatically feeding grain to poultry.

The object of the improvements which form the subject matter of this application is to provide a device that will be operable in part through gravity and in part through the efforts of one or more of the fowls being fed.

Another object is to scatter the grains over a relatively larger area so that as many fowls may be reached as possible.

A further object is to so construct the device that it can be made economically and durable and not liable to get out of order.

Having these and other objects of general novelty and utility in view, we have invented the device shown in preferred form in the accompanying drawing in which the figure is an elevation of the device with portions broken away to more clearly disclose its construction and operation.

Referring to said drawing in detail, 1 represents a cylindrical hopper provided with a bail 2 which is shown as suspended from a hook 3 secured in an overhead timber or support 4. The bottom 5 of the hopper is formed with downwardly inclined walls, the upper edges of which are secured with a flange or ring 7 to the lower edge of the hopper. In the lower portion of the bottom is formed a circular opening 6. Hanging from the hopper are rods 9 which are secured at their upper ends to the flange 7 by nuts 10. The lower ends of these rods are inserted through suitable openings in the conical spreader 8 and the latter is held on said rods by the upturned or hooked ends 11 of the rods. Within the hopper is secured an arch 12 consisting of a metal bar or strap which straddles the opening 6 and is secured to the bottom of the hopper by rivets 13. Passing through a central opening in the arch 12 is a rod 14 the upper end of which is supplied with a nut 15 by which it is held to the arch. The lower end of the rod 14 is bent to form an eye 17 which engages a corresponding eye on the upper end of the rod 16. The latter rod passes downwardly through a suitable opening in the apex of the spreader 8 and is adapted to have attached thereto an ear of corn as 21, or any other suitable product adapted to serve as an article of food for poultry. Near the upper portion of the rod 14 at a point slightly below the opening 6 is a disk 18 which is secured on the rod by any suitable collar 19 having a set screw 20. This disk may be adjusted by the nuts 15 or 19, or both, to suit the requirements of the various uses and kinds of grain for which the device is adapted.

22 represents the grain contained in the hopper 1.

In the operation of a device constructed substantially as described, it will be seen that the grain will fall by gravity through the opening 6 upon the disk 18, from the periphery of which it will drop to the spreader 8, from which it will fall upon the ground or feeding floor. The action of gravity will be facilitated by the swinging movements of the rods 16 and 14 which movements will be communicated by one or more of the fowls picking at the product 21 the latter being hung within reach of the fowls. The vibration of the rod 16 in the spreader 8 will also cause more or less vibration of the rods 9 and thus tend to jar the hopper and thereby facilitate the falling of the grain through the opening 6 and the distribution from the disk 18. If the grain feeds too freely through the opening 6 the disk 18 may be raised by the nut 15, until the proper opening is obtained.

Having thus described our invention, what we claim, is:—

1. In a feeding device, a hopper having a discharge opening in its bottom, a spreader arranged below said hopper, a jointed rod connected with the bottom of the hopper and extending through said spreader, a disk adjustably mounted on said rod below the opening in said hopper, and brace rods connecting the spreader with the hopper.

2. In a feeding device, a hopper having a discharge opening in its bottom, an arch secured to the bottom of the hopper above said opening, a cone-shaped spreader arranged below said hopper, a jointed rod between said yoke and spreader, and a disk mounted on said connection below the opening in the hopper.

In testimony whereof we affix our signatures in presence of two witnesses.

WILLIAM M. COX.
ROBERT M. COX.

Witnesses:
F. W. TOMPKINS,
A. E. LILLIE.